(12) United States Patent
Grant et al.

(10) Patent No.: US 7,155,343 B2
(45) Date of Patent: Dec. 26, 2006

(54) NANOCIRCUITRY FOR SENSING, RECORDING AND OUTPUTTING DATA

(76) Inventors: Charles A. Grant, 18 Sunset Dr., Kensington, CA (US) 94707; Eugene F. Grant, 1304 Marinette Rd., Pacific Palisades, CA (US) 90272

( * ) Notice: Subject to any disclaimer, the term of this patent is extended or adjusted under 35 U.S.C. 154(b) by 30 days.

(21) Appl. No.: 11/060,874

(22) Filed: Feb. 18, 2005

(65) Prior Publication Data
US 2006/0190177 A1   Aug. 24, 2006

(51) Int. Cl.
*G01V 15/00* (2006.01)
(52) U.S. Cl. .............. 702/2; 340/568.1; 340/572.1; 340/572.2; 702/3; 702/187; 977/943; 977/950; 977/953
(58) Field of Classification Search .............. 702/2, 702/19, 22, 130, 131, 139, 182–188, 3; 340/568.1, 340/572.1, 572.2; 977/904, 932, 943, 950, 977/953–960
See application file for complete search history.

(56) References Cited

U.S. PATENT DOCUMENTS

| | | | |
|---|---|---|---|
| 6,117,643 A * | 9/2000 | Simpson et al. | 435/7.1 |
| 6,285,955 B1 * | 9/2001 | Goldwasser | 702/6 |
| 6,859,831 B1 * | 2/2005 | Gelvin et al. | 709/224 |
| 7,020,701 B1 * | 3/2006 | Gelvin et al. | 709/224 |
| 7,049,963 B1 * | 5/2006 | Waterhouse et al. | 340/572.1 |
| 7,068,170 B1 * | 6/2006 | Green | 340/572.1 |
| 7,080,544 B1 * | 7/2006 | Stepanik et al. | 73/31.02 |
| 2004/0189473 A1 * | 9/2004 | Mickle et al. | 340/572.4 |
| 2005/0055162 A1 * | 3/2005 | Gao et al. | 702/2 |
| 2006/0046664 A1 * | 3/2006 | Paradiso et al. | 455/96 |

OTHER PUBLICATIONS

Rex Min et al., "Energy-Centric Enabling Technologies For Wireless Sensor Networks", IEEE Wireless Communications, Aug. 2002, pp. 28-39.*
NMRC Ireland's ICT Research Institute, Annual Report, 2002, from web site www.nrmc.je, cover page and p. 13.*
"Nano Paints on Display at the 2004 National Hardware Show", 2004, 3 pages, article from Internet web site www.voyle.net/Nano%20Products/Products%202004-0022.htm.*

* cited by examiner

*Primary Examiner*—Donald McElheny, Jr.
(74) *Attorney, Agent, or Firm*—West & Associates, A PC; Stuart J West; James R. Hannah (57) ABSTRACT

The device implements nanotechnology by embedding nanocircuits with sensors to surfaces such as walls, wall coverings, clothing, windows, window coverings, flooring, roofs, roadways and telephone poles. Using a plurality of nanocircuits in a multitude of locations, events can be continuously detected and recorded without intrusion, and reconstructed at a later time.

3 Claims, 5 Drawing Sheets

NANOCIRCUITRY FOR SENSING, RECORDING AND OUTPUTTING DATA

FIELD OF THE INVENTION

The present disclosure is related to a method and apparatus for embedding nanosensors on a surface for the sensing and recording of data.

BACKGROUND

Today, electrical circuits can be manufactured at the nanometer level. Current manufacturing processes include the use of lithography to imprint microscopic circuits on semiconductor materials. Other processes use molecular materials such as nanotubes to fabricate tiny electric devices such as diodes or transistors. These molecular nanoelectronics are assembled using contacts and gaps on an atomic scale to form integrated electrical circuits and nanosensors. The small size of nanosensors results in reduced weight, low power requirements, and greater sensitivity. With the development of revolutionary fabrication techniques, nanosensors can now be mass-produced at a fraction of the cost using convenient and/or known methods.

Nanotechnology has far-reaching benefits spanning from physical and electro-sensors to chemical and biosensors. Industries affected by this technology range from security to transportation. In the security industry, discrete sensors are often desired in order to clandestinely monitor activities. The vast majority of sensors used today are large and easily visible, and have to be camouflaged to hide their position. Thus, it is often possible for criminals to avoid detection by locating the sensors and avoiding or disabling them. As a result, legal costs increase as more effort is needed to examine and produce sufficient evidence to sustain a conviction. In the transportation and insurance industries, a multitude of sensors recording data is the optimal technique for precise re-enactment of a traffic accident. Such data collection is not possible with currently-available sensors, because the placement of such sensors directly on the road would impede traffic flow. When the use of sensors is necessary, such as for the weight inspection of commercial cargo trucks, vehicles are forced to exit the freeway. Further, if placed in the freeway, the sensors would be subject to heavy wear and tear from the high volume of traffic.

The use of multiple discrete sensors could be used in a variety of other situations such as, by way of example, re-enactment of crime scenes, monitoring and control of pedestrian and automobile traffic, providing building safety and security, collecting data for demographic purposes, even providing aid in the creation of video games. This is only a small illustration of the benefits available from a device that detects data invisibly from virtually any position.

What is needed is a device that implements nanosensor technology to allow data to be detected inconspicuously and simultaneously from a multitude of unanticipated locations.

DETAILED DESCRIPTION

Figure 1:
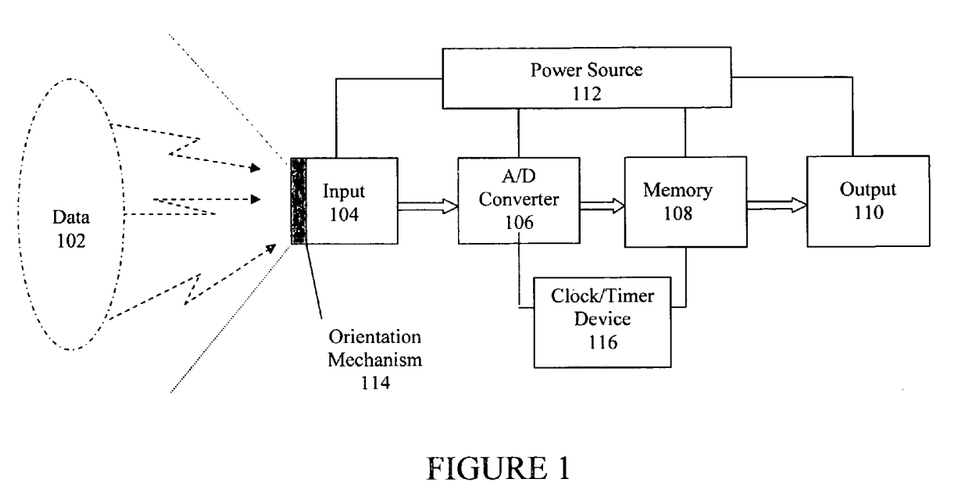
FIG. 1 depicts a block circuit diagram of a sensor.

FIG. 1 depicts a schematic circuit diagram of a sensor. In the embodiment shown in FIG. 1, the sensor is comprised of an input 104, an analog to digital converter 106, memory 108, an output 110, a power source 112, and an orientation mechanism 114. As is shown in FIG. 1, the input 104 of the sensor can detect data 102. The input 104 is connected with a converter 106. The converter 106 can convert the detected data 102 from an analog signal into a digital signal. The converter 106 is connected with memory 108. The memory 108 can store the digital signal outputted by the converter 106. The memory 108 is connected with an output 110. The output 110 can transmit the data to a source for data collection and reconstruction. Also shown is a power source 112 connected with all components of the sensor. Also, as shown in the embodiment shown in FIG. 1, an orientation mechanism 114 can be attached to the input 104. In the event that the input 104 of the sensor was incorrectly situated, the orientation mechanism 114 can be utilized to orient the sensor to allow for the detection of data 102.

In alternate embodiments, the sensor can be constructed in any convenient and/or known manner using any convenient and/or known material or components. The sensor, by way of example, can be fabricated using electron beam lithography, atomic force microscopes, electrochemical deposition and etching, electromigration, voltage etching, and/or any other micro-electronic and/or nano-manufacturing process and/or algorithm. The material of the sensors, by way of example, can be silicon and/or any other semi-conducting crystalline material, nanotubes and/or any other semi-conducting molecules, particles, and/or atoms, and/or any other known and/or convenient material.

In further alternate embodiments, the component arrangement of the sensor can be in any convenient and/or known configuration. By way of example, the input 104 can be directly connected with a data collection source thereby removing the converter 106, memory 108, and output 110; the converter 106 can be directly connected with a data collection source thereby removing the memory 108 and output 110; the converter 106 can be connected directly to the output 110 thereby removing the memory 108; the memory 108 can be connected with a data collection source thereby removing the output 110; the orientation mechanism 114 can be removed or positioned in any known and/or convenient location on the sensor. In addition, the power source 112 can be constructed in any convenient and/or known manner using any convenient and/or known material. By way of example, the power source can use direct or alternating current being rechargeable or non-rechargeable. Also, by way of example, the components of the sensor can be connected in any convenient and/or known parallel/series combination. Furthermore, additional components can be included and/or excluded in any convenient and/or known arrangement.

In addition, in alternate embodiments, the input 104 of the sensor can be calibrated to detect a variety of data 102. By way of example, the input 104 of the sensor can be calibrated to detect image, temperature, sound, motion, chemical, biological, or any other convenient and/or known data capable of detection. Also, in alternate embodiments, the output of the sensor can be, by way of example, a transmitter, transponder, antenna, receiver, responder or any other convenient and/or known device capable of data transmission and/or storage. Using a plurality of sensors, recorded events can be reconstructed from the transmitted and/or stored data 102.

In still further alternate embodiments, the device can include a clock and/or timing mechanism 116. The clock and/or timing mechanism can be used to time stamp data at is it received. In alternate embodiments, the clock and/or timing mechanism 116 can be used to cause the device to record data at specified time intervals and/or can be used to erase memory at specified times and/or time intervals. In alternate embodiments, the clock and/or timing mechanism 116 may not be present, can be external to the device and timing can be controlled by a transmitted or received signal and/or signals and/or controlled by any other convenient mechanism.

Figure 2:
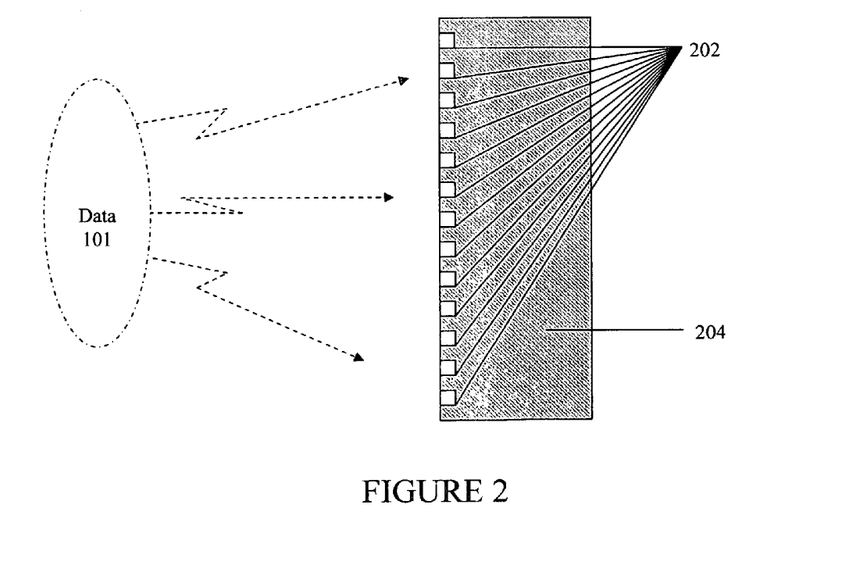
FIG. 2 depicts a wall having sensors embedded therein.

FIG. 2 depicts a side view of a wall having embedded sensors therein. As shown in the embodiment shown in FIG. 2, sensors 202 are embedded in a wall 204 composed of gypsum. The placement of the sensors 202 in the gypsum 204 allows for the inconspicuous detection of data 101 from the various locations of the sensors 202. In the embodiment shown in FIG. 2, the sensors 202 can be positioned and fixed during construction of the gypsum 204 thus eliminating the orientation of the sensors 202. The sensors 202 shown in FIG. 2 are similar to the sensor 202 depicted in the embodiment shown in FIG. 1. Thus, as shown in the embodiment shown in FIG. 2, the sensors 202 detect data 101, covert the data from an analog to digital signal, and then transmit the data to a data collection source.

In alternate embodiments, the sensors 202 can be embedded in the wall 204 using any convenient and/or known method. By way of example, the sensors 202 can be buried, deposited, enclosed, fastened, fixed, infixed, ingrained, inlayed, inserted, installed, lodged, planted, plunged, pressed, stuck, or implanted in the wall 204 during or after construction. In addition, the wall 204 can be composed of any convenient and/or known material and can be constructed using any convenient and/or known method of construction. By way of example, the wall can be composed of drywall, sheetrock, wallboard, greenboard, backerboard, plaster, brick or lumber. Also, in alternate embodiments, the sensors can be calibrated to detect a variety of data 101, including, by way of example, image, temperature, sound, motion, chemical, biological, or any other convenient and/or known data capable of detection. The wall 204, in alternate embodiments, can be interior and/or exterior and used to detect inside and/or outside data 101 in and/or from any convenient and/or known structure. In alternate embodiments, the sensors 202 can be constructed in any convenient and/or known manner with any convenient and/or known material using any convenient and/or known combination of components and/or circuitry. Further, in alternate embodiments, the sensors 202 can output the data using any convenient and/or known method and/or can store the data for collection at a later time. Using a plurality of sensors, recorded events can be reconstructed from the transmitted and/or stored data 101.

Figure 3:
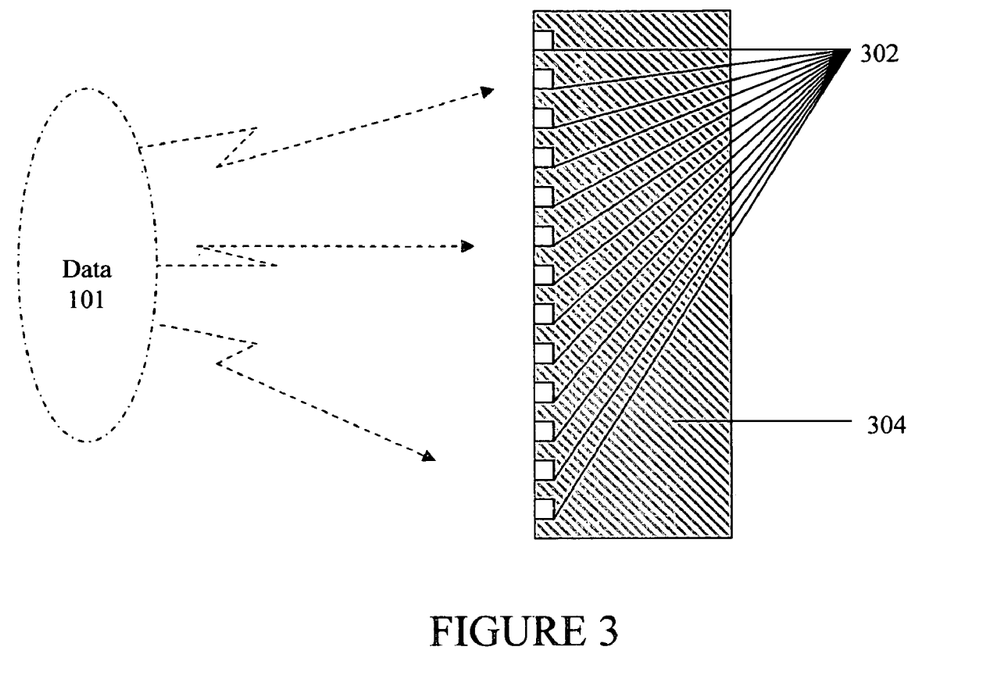
FIG. 3 depicts an alternate embodiment of the embodiment shown in FIG. 2.

FIG. 3 depicts an alternate embodiment of the embodiment shown in FIG. 2. In the embodiment shown in FIG. 3, sensors 302 are embedded in a wall 304 composed of stucco. In the embodiment shown in FIG. 3, the sensors 302 are positioned and fixed during construction of the stucco 304 thus eliminating the orientation mechanism. The embodiment shown in FIG. 3 is intended to illustrate an alternate composition of a wall 304 in which the sensors 302 can be embedded to detect data 101 invisibly from one or more sensor locations.

In alternate embodiments, the sensors 302 can be embedded in the wall 304 using any convenient and/or known method. By way of example, the sensors 302 can be buried, deposited, enclosed, fastened, fixed, infixed, ingrained, inlayed, inserted, installed, lodged, planted, plunged, pressed, stuck, or implanted in the wall 304 during or after construction. In addition, the wall 304 can be composed of any convenient and/or known material and can be constructed using convenient and/or known methods of construction. Also, in alternate embodiments, the sensors can be calibrated to detect a variety of data 101, including, byway of example, image, temperature, sound, motion, chemical, biological, or any other convenient and/or known data capable of detection. The wall 304, in alternate embodiments, can be interior and/or exterior and used to detect inside and/or outside data 101 in and/or from any convenient and/or known structure. In alternate embodiments, the sensors 302 can be constructed in any convenient and/or known manner with any convenient and/or known material using any convenient and/or known combination of components and/or circuitry. Further, in alternate embodiments, the sensors 302 can output the data using any convenient and/or known method and/or can store the data for collection at a later time. Using a plurality of sensors, recorded events can be reconstructed from the transmitted and/or stored data 101.

Figure 4:
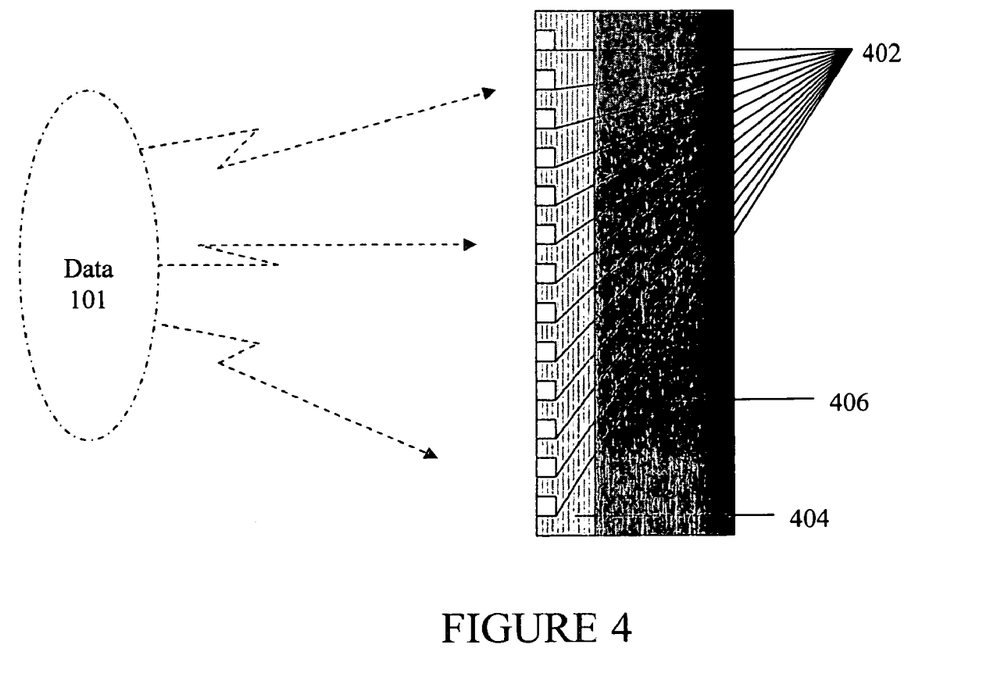
FIG. 4 depicts a wall covering having sensors embedded therein.

FIG. 4 depicts a side view of a wall covering having embedded sensors therein. In the embodiment shown in FIG. 4, sensors 402 are embedded in a wall covering 404 composed of wallpaper that is attached to a wall 406. The sensors 402 in the embodiment shown in FIG. 4 detect data 101 invisibly by being embedded in the wallpaper 404. In the embodiment shown in FIG. 4, the sensors 402 are positioned and fixed during construction of the wallpaper 404 thus eliminating the orientation mechanism. The sensors 402 as shown in the embodiment shown in FIG. 4 are similar to the sensors 202 as shown in the embodiment shown in FIG. 2.

In alternate embodiments, the sensors 402 can be embedded in the wall covering 404 using any convenient and/or known method. By way of example, the sensors 402 can be buried, deposited, enclosed, fastened, fixed, infixed, ingrained, inlayed, inserted, installed, lodged, planted, plunged, pressed, stuck, or implanted in the wall covering 404 during or after construction. In addition, the wall covering 404 can be composed of any convenient and/or known material and can be constructed using any convenient and/or known method of construction. In alternate embodiments, the wall covering 404 can be associated with the wall 406 or any other surface using any convenient and/or known method. Also, in alternate embodiments, the sensors can be calibrated to detect a variety of data 101, including, by way of example, image, temperature, sound, motion, chemical, biological, or any other convenient and/or known data capable of detection. The wall covering 404, in alternate embodiments, can be interior and/or exterior and used to detect inside and/or outside data 101 in and/or from any convenient and/or known structure. In alternate embodiments, the sensors 402 can be constructed in any convenient and/or known manner with any convenient and/or known material using any convenient and/or known combination of components and/or circuitry. Further, in alternate embodiments, the sensors 402 can output the data using any convenient and/or known method and/or can store the data for collection at a later time. Using a plurality of sensors, recorded events can be reconstructed from the transmitted and/or stored data 101.

Figure 5:
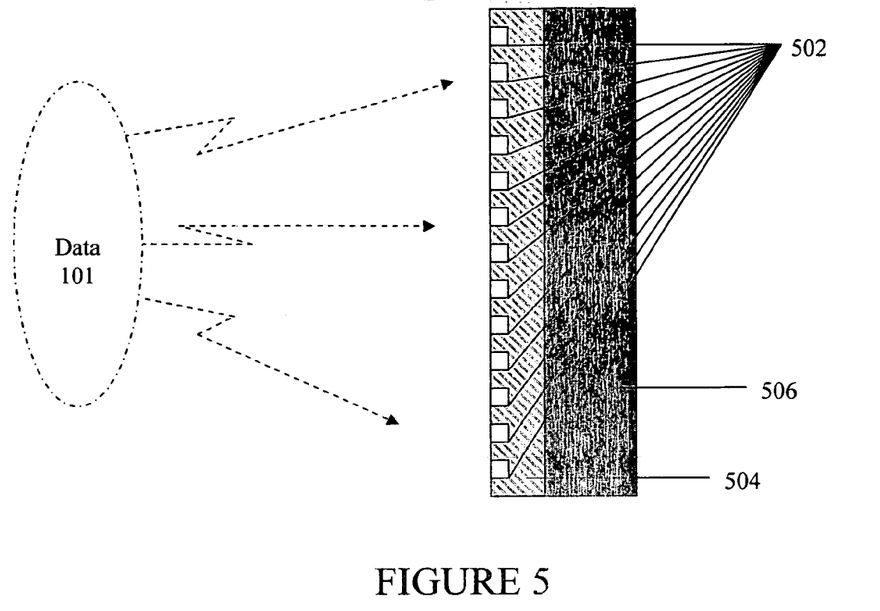
FIG. 5 depicts an alternate embodiment of the embodiment shown in FIG. 4.

FIG. 5 depicts a side view of a spreadable medium having sensors embedded therein associated with a surface. In the embodiment shown in FIG. 5, the spreadable medium 504 composed of paint is applied to a wall 506. Sensors 502 are embedded in the paint 504 to detect data 101. In the embodiment shown in FIG. 5, the sensors have been oriented after application of the paint 504 to the wall 506 and can be in a fixed position. Because the sensors 502 are embedded within the paint 504, the sensors 502 are able to detect data 101 discreetly. The sensors 502 as shown in the embodiment shown in FIG. 5 are similar to the sensors 202 shown in the embodiment shown in FIG. 2.

In alternate embodiments, the spreadable medium 504 can be composed of any convenient and/or known material. By way of example, the spreadable medium 504 can be paint, cement, asphalt, concrete, acrylic, chroma, coloring, dye, emulsion, enamel, flat, gloss, greasepaint, latex, oil, overlay, pigment, rouge, stain, tempera, varnish, veneer or wax. Also, in alternate embodiments, the spreadable medium can be associated using any convenient and/or known method to any convenient and/or known surface. In addition, in alternate embodiments, the sensors can be calibrated to detect a variety of data 101, including, by way of example, image, temperature, sound, motion, chemical, biological, or any other convenient and/or known data capable of detection. The spreadable medium 504, in alternate embodiments, can be used to detect inside and/or outside data 101 in and/or from any convenient and/or known surface being interior and/or exterior. In alternate embodiments, the sensors 502 can be constructed in any convenient and/or known manner with any convenient and/or known material using any convenient and/or known combination of components and/or circuitry. Further, in alternate embodiments, the sensors 502 can output the data using any convenient and/or known method and/or can store the data for collection at a later time. Using a plurality of sensors, recorded events can be reconstructed from the transmitted and/or stored data 101.

Figure 6:
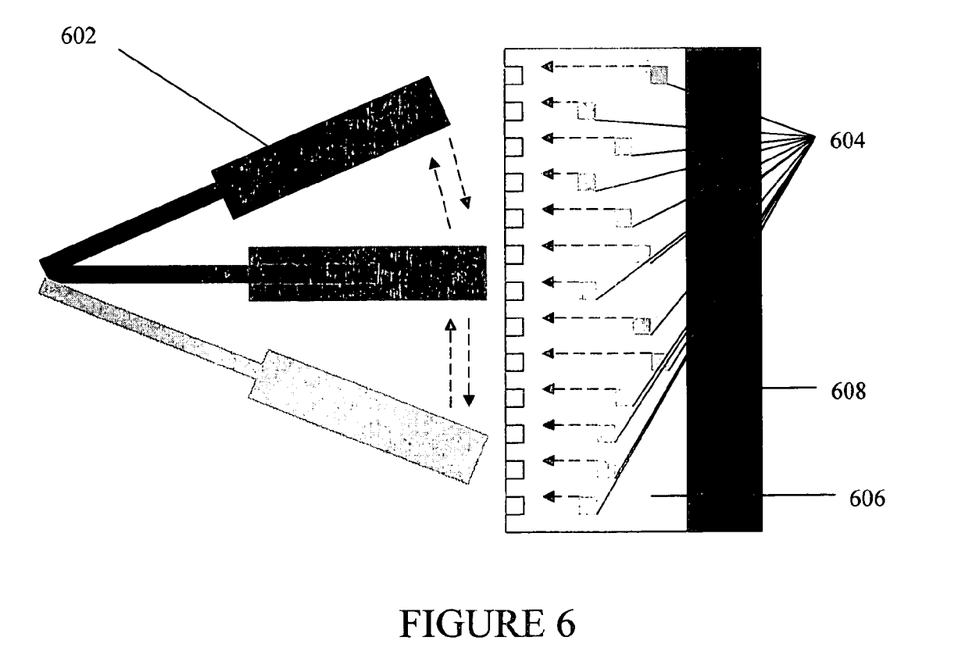
FIG. 6 depicts an orientation device.

FIG. 6 depicts an orientation device that can be used to orient the sensors. As shown in the embodiment shown in FIG. 6, a magnetic orientation device 602 is being passed over a surface covered by a spreadable medium 606 composed of paint with sensors 604 embedded therein. The paint 606 is not settled and the sensors 604, at first, are not correctly situated. As can be seen in the embodiment shown in FIG. 6, the magnetic orientation device 602 is being passed over the unsettle paint 606. The sensors 604 are pulled to the surface of the paint 606 by the magnetic force resultant from the orientation mechanism on the sensors 604 and the magnetic orientation device. After the sensors 604 have been oriented properly, the paint 606 dries and the sensors 604 are in a fixed position on the wall 608. The sensors 604 as shown in the embodiment shown in FIG. 6 are similar to the sensors 202 as shown in the embodiment shown in FIG. 2.

In alternate embodiments, the orientation device 602 can be any constructed in any convenient and/or known manner using any convenient and/or known method and/or force to orient the sensors 604. Also, in alternate embodiments, the spreadable medium 606 can be composed of any convenient and/or known material. In alternate embodiments, the spreadable medium 606 can be associated using any convenient and/or known method to any convenient and/or known surface. In addition, in alternate embodiments, the sensors 604 can be constructed in any convenient and/or known manner with any convenient and/or known material using any convenient and/or known combination of components and/or circuitry. The orientation mechanism on the sensors 604 can be any convenient and/or known material being drawn and/or attracted to any convenient and/or known force. In an alternate embodiment, the device 602 can be used to collect and/or retrieve data and/or recharge the sensors with or without the capability to orient the sensors. In further alternate embodiments, any known and/or convenient manner to orient the sensors can be used or the sensors may not be oriented.

Figure 7:
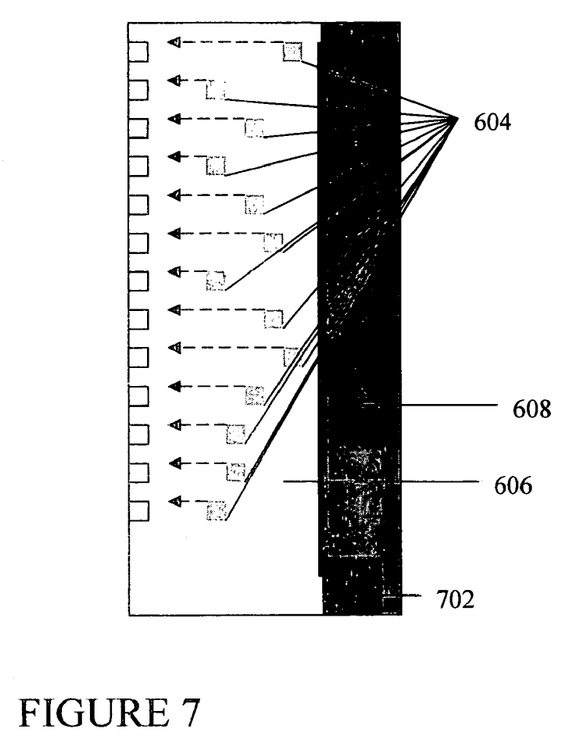
FIG. 7 depicts an alternate embodiment of the embodiment shown in FIG. 6.

FIG. 7 depicts an alternate embodiment of the embodiment shown in FIG. 6. As shown in the embodiment shown in FIG. 7, an orientation device 702 is embedded in a wall 608. The wall 608 is covered with a spreadable medium 606 composed of paint with embedded sensors 604. The paint 606 is not settled and the sensors 604, at first, are not correctly situated. As can be seen in the embodiment shown in FIG. 7, the orientation device 702 is activated. The sensors 604 are repelled from the orientation device 702 and pushed toward the outer surface of the paint 606. After the sensors 604 have been oriented properly, the paint 606 dries and the sensors 604 are in a fixed position on the wall 608. The sensors 604 as shown in the embodiment shown in FIG. 6 are similar to the sensors 202 as shown in the embodiment shown in FIG. 2 with the exception of the orientation mechanism being attached at the opposite end.

In further alternate embodiments, the orientation device 702 can be any constructed in any convenient and/or known manner using any convenient and/or known method and/or force to orient the sensors 604. Also, in alternate embodiments, the wall 606 can be composed of any convenient and/or known material and the orientation device 702 can be embedded in any convenient and/or known arrangement using any convenient and/or known manner and/or method of construction. In alternate embodiments, the spreadable medium 606 can be associated using any convenient and/or known method to any convenient and/or known surface. In addition, in alternate embodiments, the sensors 604 can be constructed in any convenient and/or known manner with any convenient and/or known material using any convenient and/or known combination of components and/or circuitry. The orientation mechanism on the sensors 604 can be arranged in any convenient and/known manner and can be constructed with any convenient and/or known material being repelled from and/or attracted to any convenient and/or known force. In an alternate embodiment, the device 606 can be used to collect and/or retrieve data and/or recharge the sensors with or without the capability to orient the sensors.

Figure 8:
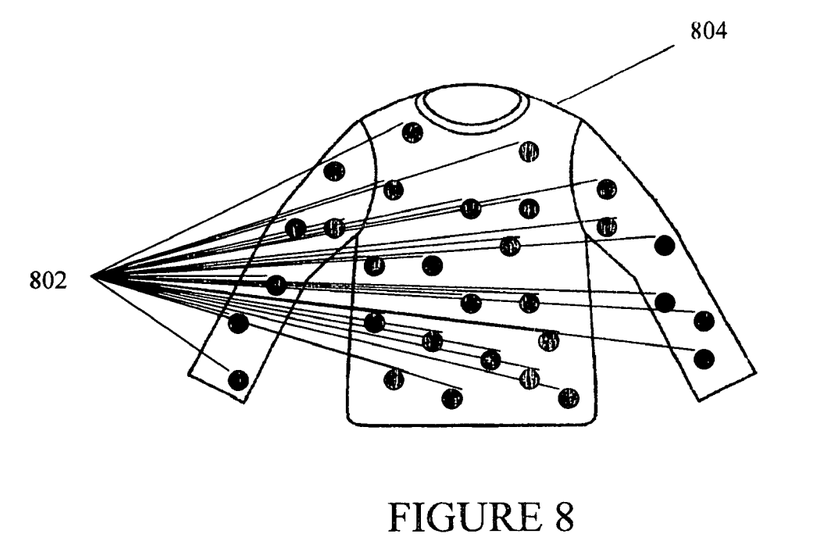
FIG. 8 depicts an article of wearing apparel having sensors embedded therein.

FIG. 8 depicts an article of wearing apparel having sensors embedded therein. As shown in the embodiment shown in FIG. 8, sensors 802 are embedded in a long-sleeve shirt 804. The sensors 802 as shown in the embodiment shown in FIG. 8 detect and transmit biological data. In the embodiment shown in FIG. 8, the sensors 802 are positioned and fixed during construction of the shirt 804 thus eliminating an orientation mechanism. The sensors 802 as shown in the embodiment shown in FIG. 8 are similar to the sensors 202 as shown in the embodiment shown in FIG. 2.

In alternate embodiments, the sensors 802 can be embedded in an article of wearing apparel 804 using any convenient and/or known method. By way of example, the sensors 802 can be buried, deposited, enclosed, fastened, fixed, infixed, ingrained, inlayed, inserted, installed, lodged, planted, plunged, pressed, stuck, or implanted in the article of wearing apparel during or after construction. In addition, the article of wearing apparel 804 can be composed of any convenient and/or known material and can be constructed using any convenient and/or known method of construction. Also, in alternate embodiments, the sensors can be calibrated to detect a variety of data, including, by way of example, image, temperature, sound, motion, chemical, biological, or any other convenient and/or known data capable of detection. For example, the sensors 802 can be calibrated to detect motion data. Because of the multiple sensor locations within the article of wearing apparel 804, the motion data can provide for a detailed reconstruction of any movement. In alternate embodiments, the sensors 802 can be constructed in any convenient and/or known manner with any convenient and/or known material using any convenient and/or known combination of components and/or circuitry. Further, in alternate embodiments, the sensors 802 can output the data using any convenient and/or known method and/or can store the data for collection at a later time. Using a plurality of sensors, recorded events can be reconstructed from the transmitted and/or stored data.

In still further alternate embodiments, the sensors 106 can be included in a spreadable liquid and/or other known and/or convenient medium which can be associated with an article of wearing apparel 804 in any known and/or convenient manner.

Figure 9:
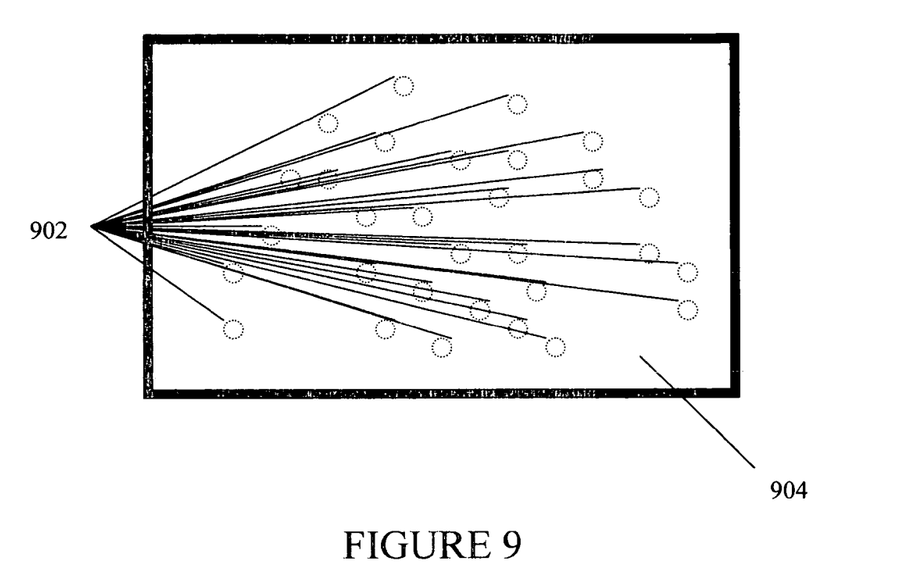
FIG. 9 depicts a window having sensors embedded therein.

FIG. 9 depicts a front view of a window having sensors embedded therein. In the embodiment shown in FIG. 9, the sensors 902 are embedded in a window 904. Because of the small size of the sensors 902, the sensors 902 are invisible and do not impair images seen through the window 904. In the embodiment shown in FIG. 9, the sensors 902 are positioned and fixed during construction of the window 904 thus eliminating an orientation mechanism. The sensors 904 as shown in the embodiment shown in FIG. 9 are similar to the sensors 202 as shown in the embodiment shown in FIG. 2.

In alternate embodiments, the sensors 904 can be embedded in the window 904 using any convenient and/or known method. By way of example, the sensors 904 can be buried, deposited, enclosed, fastened, fixed, infixed, ingrained, inlayed, inserted, installed, lodged, planted, plunged, pressed, stuck, or implanted in the windows during or after construction. In addition, the window 904 can be composed of any convenient and/or known material and can be constructed using any convenient and/or known method of construction. In alternate embodiments, the sensors 904 can be placed in the window frame as well in the glass or in any convenient and/or known combination and/or arrangement thereof. Also, in alternate embodiments, the sensors 904 can be calibrated to detect a variety of data, including, by way of example, image, temperature, sound, motion, chemical, biological, or any other convenient and/or known data capable of detection. The window 904, in alternate embodiments, can be used to detect inside and/or outside data in and/or from any convenient and/or known structure. In alternate embodiments, the sensors 802 can be constructed in any convenient and/or known manner with any convenient and/or known material using any convenient and/or known combination of components and/or circuitry. Further, in alternate embodiments, the sensors 802 can output the data using any convenient and/or known method and/or can store the data for collection at a later time. Using a plurality of sensors, recorded events can be reconstructed from the transmitted and/or stored data.

Figure 10:
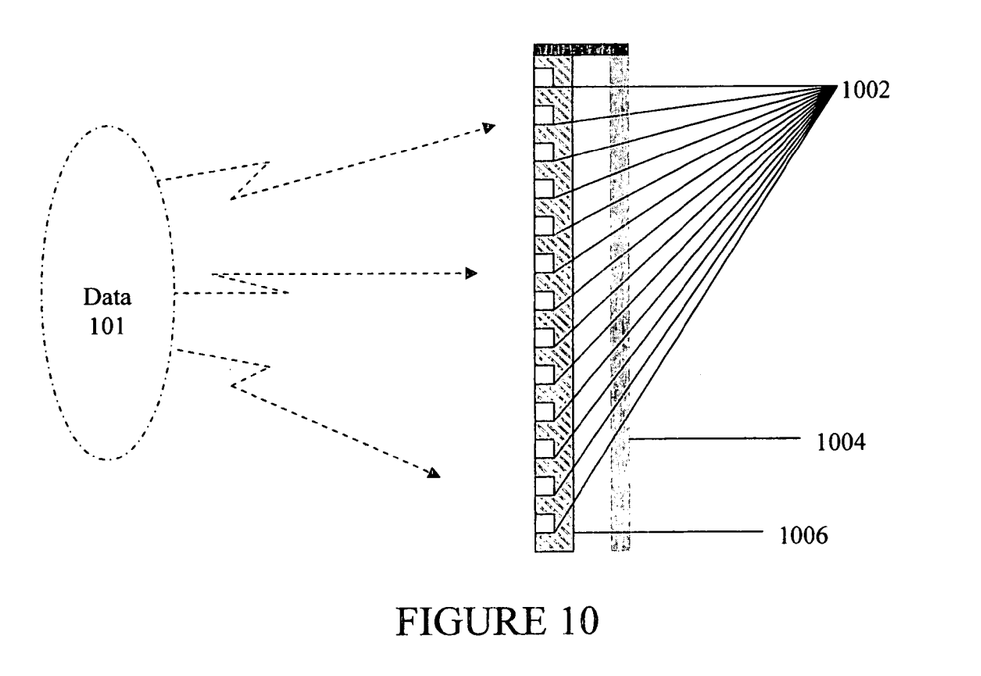
FIG. 10 depicts a window covering having sensors embedded therein.

FIG. 10 depicts a side view of a window covering having sensors embedded therein attached to a window. As shown in the embodiment shown in FIG. 10, sensors 1002 are embedded in a window covering 1006 comprised of drapes. The drapes 1006 are used to cover the window 1004. The sensors 1002 detect data 101 unnoticeably because the sensors 1002 are embedded within the material of the drapes 1006. In the embodiment shown in FIG. 10, the sensors 1002 are positioned and fixed during construction of the drapes 1006 thus eliminating an orientation mechanism. The sensors 1002 as shown in the embodiment shown in FIG. 10 are similar to the sensors 202 as shown in the embodiment shown in FIG. 2.

In alternate embodiments, the sensors 1002 can be embedded in the window covering 1006 using any convenient and/or known method. By way of example, the sensors 1002 can be buried, deposited, enclosed, fastened, fixed, infixed, ingrained, inlayed, inserted, installed, lodged, planted, plunged, pressed, stuck, or implanted in the window covering during or after construction. In addition, the window covering 1006 can be composed of any convenient and/or known material and can be constructed using any convenient and/or known method of construction. For example, the window coverings 1006 can be composed of mini-blinds or any other blinds and/or material used to cover a window 1004. In alternate embodiments, the sensors 1002 can be placed in the window 1004, the window frame, or the window covering 1006 in any convenient and/or known combination and/or arrangement thereof. In addition, in an alternate embodiment, the window covering can be associated with the window in any convenient and/or known manner and/or method. Also, in alternate embodiments, the sensors 1002 can be calibrated to detect a variety of data 101, including, by way of example, image, temperature, sound, motion, chemical, biological, or any other convenient and/or known data capable of detection. The windows covering 1006, in alternate embodiments, can be used to detect inside and/or outside data 101 in and/or from any convenient and/or known structure. In alternate embodiments, the sensors 1002 can be constructed in any convenient and/or known manner with any convenient and/or known material using any convenient and/or known combination of components and/or circuitry. Further, in alternate embodiments, the sensors 1002 can output the data using any convenient and/or known method and/or can store the data for collection at a later time. Using a plurality of sensors, recorded events can be reconstructed from the transmitted and/or stored data 101.

In one embodiment of the invention, sensors that are fabricated on the nanometer level (typically 100 µm–30 nm) are embedded in a wall during the construction of the wall. The nanosensors are able to detect external data, convert the data from an analog signal to a digital signal, store the data in memory, and transmit the data to a receiver. The external data may include temperature, light, movement, chemical makeup, and pressure applied. The receiver collects and compiles this data from the sensors and outputs an intelligible readout and/or report of the data collected. The data can be stored and retrieved at a later time to reconstruct prior events.

The wall can be constructed in any manner using any conventional material. Commercially available examples include gypsum, drywall, sheetrock, wallboard, greenboard, backerboard, stucco, or plaster. The wall can be interior or exterior. In addition, the wall may be constructed on-site or imported from an off-site location. The sensors can then be embedded within the wall using any method. By way of example, the sensors can be buried, deposited, enclosed, fastened, fixed, infixed, ingrained, inlayed, inserted, installed, lodged, planted, plunged, pressed, stuck, or implanted into an outer surface of the wall. The wall structure can then be used to detect and record data from any source that the wall surface is exposed to, inside or outside. The sensors can be embedded during or after construction of the wall in any conventional arrangement.

In an alternate embodiment of the device, nanosensors are embedded in a wall covering which is then associated with a wall. The wall covering can be constructed in any manner. The wall covering can also constructed using any conventional material, including by way of example, as paper, tile, or paneling material. The material can be artistic or functional. The sensors can be embedded within the wall covering using any method. By way of example, the sensors can be buried, deposited, enclosed, fastened, fixed, infixed, planted, ingrained, inlayed, lodged, inserted, installed, plunged, pressed, stuck, or implanted in the wall covering. The wall covering can then be associated with the wall in any manner. By way of example, the wall covering can be affixed, attached, bound, bonded, brazed, clasped, fastened, fixed, fused, glued, hung, lodged, pasted, soldered, stuck, united, or welded to the wall. The wall covering can be associated using a removable or non-removable adhesive. The wall covering can be used to detect data inside or outside of a structure. The sensors can be embedded during or after construction of the wall covering and can be placed in any conventional arrangement.

In a further embodiment of the invention, nanosensors are dispersed in a spreadable medium and the medium applied onto a surface. The spreadable medium can be composed of any conventional material. By way of example, the spreadable medium can be composed of paint, cement, asphalt, concrete, acrylic, chroma, coloring, dye, emulsion, enamel, flat, gloss, greasepaint, latex, oil, overlay, pigment, rouge, stain, tempera, varnish, veneer, wax, or any other material that can be applied to a surface. The spreadable medium can be applied to a surface using any known method. By way of example, the spreadable medium can be applied to the surface by being painted, brushed, smeared, coated, washed, buffed, glazed, glossed, laid, set, spread or any other method of association. The spreadable medium can be used to detect inside or outside data from any surface.

In a further embodiment of this device, nanosensors are embedded in an article of apparel. The article of apparel can be composed of any conventional material and the sensors can be embedded using any method. By way of example, the sensors can be buried, deposited, enclosed, fastened, fixed, infixed, planted, ingrained, inlayed, lodged, inserted, installed, plunged, pressed, stuck, or implanted in the article of wearing apparel. The sensors can be embedded during or after construction of the article of wearing and placed in any arrangement.

In an alternate embodiment of this device, nanosensors are embedded in a window. The window can be composed of any material and the sensors can be embedded using any method. By way of example, the window can be made of aluminum, vinyl, wood, fiberglass, fibrex and can be a single hung, double hung, casement, awning, bay, bow, fixed frame, skylight, or slider. By way of example, the sensors can be buried, deposited, enclosed, fastened, fixed, infixed, planted, ingrained, inlayed, lodged, inserted, installed, plunged, pressed, stuck, or implanted in the window. The window can be used to detect data inside or outside of any structure. The sensors can be embedded during or after construction of the window and placed in any conventional arrangement.

Further, in an alternate embodiment, nanosensors are embedded in window coverings. The window coverings can be composed of any material and the sensors can be embedded using any conventional method. The window covering, by way of example, can be composed of blinds, drapes, shades, or any other material used to cover a window. The sensors can be embedded using any method, including by way of example, being buried, deposited, enclosed, fastened, fixed, infixed, planted, ingrained, inlayed, lodged, inserted, installed, plunged, pressed, stuck, or implanted in the window covering. The window covering can be used to detect data inside or outside of a structure. The sensors can be embedded during or after construction of the window covering and placed in any conventional arrangement.

In alternate embodiments, nanosensors are embedded in a number of other unanticipated locations. These locations include, by way of example, flooring, roofs, and telephone poles.

The sensors can be constructed in any manner using any conventional material. The sensors, by way of example, can be fabricated using electron beam lithography, atomic force microscopes, electrochemical deposition and etching, electromigration, voltage etching, and/or any other micro-electronic and/or nano-manufacturing process and/or algorithm. The material of the sensors, by way of example, can be composed of silicon and/or any other semi-conducting crystalline material, nanotubes and/or any other semi-conducting molecules, particles, and/or atoms, and/or any other semi-conducting material.

There are various changes and modifications that can be made as would be apparent to those skilled in the art. It is intended that the device be limited only by the scope of the claims appended hereto.

What is claimed is:

1. A method for detecting environmental analog data comprising:
   providing a plurality of sensors, each sensor comprising an input, an analog to digital converter, a timer, memory, an output and a power source, said input detecting analog data, converting said analog data to digital data, said timer signaling the time to record data, said memory storing the input and the time the data was recorded, and said output transmitting digital data upon request;
   providing a spreadable medium;
   embedding a plurality of nanocircuits in said spreadable medium; and
   associating said spreadable medium with a surface.

2. The method of claim 1, further comprising:
   providing said plurality of nanocircuits with differing timer settings so that a continuum of readings takes place.

3. The method of claim 2, further comprising:
   providing the plurality of nanocircuits with read-out-detection circuitry so that outputs may be communicated out of the memory when a read-out of stored data at a particular time in the past is desired.

* * * * *